(12) United States Patent
Hwang et al.

(10) Patent No.: US 11,399,362 B2
(45) Date of Patent: Jul. 26, 2022

(54) METHOD AND APPARATUS FOR TRANSMITTING AND RECEIVING DATA CHANNEL

(71) Applicant: LG ELECTRONICS INC., Seoul (KR)

(72) Inventors: Daesung Hwang, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 143 days.

(21) Appl. No.: 16/842,560

(22) Filed: Apr. 7, 2020

(65) Prior Publication Data

US 2020/0245314 A1 Jul. 30, 2020

Related U.S. Application Data

(63) Continuation of application No. 16/414,733, filed on May 16, 2019, now Pat. No. 10,652,865.

(30) Foreign Application Priority Data

May 16, 2018 (KR) .......................... 10-2018-0056150

(51) Int. Cl.
*H04W 72/04* (2009.01)
(52) U.S. Cl.
CPC .... *H04W 72/0406* (2013.01); *H04W 72/0453* (2013.01)
(58) Field of Classification Search
None
See application file for complete search history.

(56) References Cited

U.S. PATENT DOCUMENTS 10,652,865 B2 * 5/2020 Hwang ................ H04L 5/0094
2012/0087331 A1 4/2012 Seo et al.
(Continued)

FOREIGN PATENT DOCUMENTS

| EP | 2462703 | 11/2017 |
|----|---------|---------|
| JP | 2013539268 | 10/2013 |

OTHER PUBLICATIONS

PCT International Application No. PCT/KR2019/005869, International Search Report dated Sep. 18, 2018, 10 pages.
(Continued)

*Primary Examiner* — Kouroush Mohebbi
(74) *Attorney, Agent, or Firm* — Lee Hong Degerman Kang & Waimey

(57) ABSTRACT

A method of transmitting and receiving a data channel by a user equipment (UE) in a wireless communication system is disclosed. The method includes receiving downlink control information (DCI) including information related to a resource region for a physical downlink shared channel (PDSCH) or a physical uplink shared channel (PUSCH), acquiring a resource indication value (RIV) from the DCI, acquiring a first length of allocated resource blocks based on the RIV, scaling the first length of allocated resource blocks to a second length of allocated resource blocks, based on a scaling factor and receiving the PDSCH or transmitting the PUSCH based on the second length of allocated resource blocks, wherein the scaling factor may be $2^n$, and n may be non-negative integer.

8 Claims, 13 Drawing Sheets

(56) References Cited

U.S. PATENT DOCUMENTS

2013/0128847 A1* 5/2013 Wang .......... H04W 72/042
370/329
2018/0049203 A1 2/2018 Xue et al.

OTHER PUBLICATIONS

Vivo, "Remaining issues on eMBB DCI format," 3GPP TSG RAN WG1 Meeting #93, R1-1806058, Busan, Korea, May 21-25, 2018, 6 pages.
CATT, "On BWP operation," 3GPP TSG RAN WG1 Meeting #93, R1-1806300, Busan, Korea, May 21-25, 2018, 3 pages.
Nokia et al, "On the remaining issues for DCI format sizes and contents," 3GPP TSG RAN WG1 Meeting #93, R1-1806657, Busan, Korea, May 21-25, 2018, 5 pages.
Huawei et al, "Remaining issues on DCI contents and format," 3GPP TSG RAN WG1 Meeting #93, R1-1805882, Busan, Korea, May 21-25, 2018, 5 pages.
CATT, "Remaining issues on DCI contents," 3GPP TSG RAN WG1 Meeting #93, R1-1806291, Busan, Korea, May 21-25, 2018, 7 pages.
Wilus Inc., "Discussion on DCI contents and formats," 3GPP TSG RAN WG1 Meeting #92bis, R1-1805241, Sanya, China, Apr. 16-20, 2018, 9 pages.
Huawei et al, "DCI size and interpretation for different BWP," 3GPP TSG RAN WG1 Meeting #93, R1-1806884, Busan, Korea, May 21-25, 2018, 5 pages.
Wilus Inc., "Remaining issues on DCI contents and formats," 3GPP TSG RAN WG1 Meeting #93, R1-1807233, Busan, Korea, May 21-25, 2018, 9 pages.
Fujitsu, "Discussion on Frequency domain resource allocation," 3GPP TSG RAN WG1 Meeting NR#3, R1-1715487, Nagoya, Japan, Sep. 18-21, 2017, 4 pages.
U.S. Appl. No. 16/414,733, Office Action dated Jul. 10, 2019, 16 pages.
Ericsson, "Summary of 7.1.3.1.4 (DCI contents and formats)," TSG-RAN WG1 #92bis, R1-1805572, Apr. 2018, 19 pages.
Intel Corporation, "Remaining details of BWP adaptation," 3GPP TSG-RAN WG1 #93, R1-1806524, May 2018, 6 pages.
Nokia, "On the alignment of DCI format sizes," 3GPP TSG-RAN WG1 #92bis, R1-1804614, Apr. 2018, 5 pages.
MediaTek Inc., "Remaining Issues on DCI Contents and Formats Document for: Discussion and Decision," 3GPP TSG-RAN WG1 #93, R1-1806781, May 2018, 4 pages.
Japan Patent Office Application Serial No. 2019-540346, Office Action dated Sep. 8, 2020, 9 pages.
Intellectual Property Office of India Application Serial No. 201927050857 Office Action dated Jan. 27, 2021, 7 page.
Japan Patent Office Application No. 2019-540346, Office Action dated Jan. 25, 2022, 7 pages.
Samsung, "DCI Contents and Formats," R1-1804372, 3GPP TSG RAN WG1 Meeting #92bis, Apr. 2018, 6 pages.

* cited by examiner (A) CONTROL-PLANE PROTOCOL STACK (B) USER-PLANE PROTOCOL STACK

METHOD AND APPARATUS FOR TRANSMITTING AND RECEIVING DATA CHANNEL

CROSS-REFERENCE TO RELATED APPLICATIONS

This application is a continuation of U.S. patent application Ser. No. 16/414,733, filed on May 16, 2019, which claims the benefit of earlier filing date and right of priority to Korean Patent Application No. 10-2018-0056150, filed on May 16, 2018, the contents of which are hereby incorporated by reference herein in their entirety.

TECHNICAL FIELD

The present disclosure relates to a method and apparatus for transmitting and receiving a data channel, and more particularly, to a method and apparatus for interpreting frequency resources for a data channel by scaling a resource allocation field in downlink control information (DCI), and transmitting and receiving the data channel in the interpreted frequency resources.

BACKGROUND ART

As more and more communication devices demand larger communication traffic along with the current trends, a future-generation $5^{th}$ generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An aspect of the present disclosure is to provide a method and apparatus for transmitting and receiving a data channel.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting and receiving a data channel by a user equipment (UE) in a wireless communication system includes receiving downlink control information (DCI) including information related to a resource region for a physical downlink shared channel (PDSCH) or a physical uplink shared channel (PUSCH), acquiring a resource indication value (RIV) from the DCI, acquiring a first length of allocated resource blocks based on the RIV, scaling the first length of allocated resource blocks to a second length of allocated resource blocks, based on a scaling factor, and receiving the PDSCH or transmitting the PUSCH based on the second length of allocated resource blocks. The scaling factor may be $2^n$, and n may be non-negative integer.

A size of the DCI may be determined based on a first frequency range for initial access, and the PDSCH may be received or the PUSCH may be transmitted in a second frequency range.

Further, the scaling factor may be a largest integer of values calculated by a size of the first frequency range by $2^n$, which are equal to or less than a size of the second frequency range.

Further, the scaling factor may be acquired by applying a floor function to a value calculated by dividing a size of the second frequency range by a size of the first frequency range.

Further, a first starting resource block may be acquired based on the RIV, and scaled to a second starting resource block based on the scaling factor.

Further, the UE may be communicable with at least one of another UE, a network, a base station, or an autonomous vehicle.

In another aspect of the present disclosure, an apparatus for transmitting and receiving a data channel in a wireless communication system includes at least one processor, and at least one memory operably connectable to the at least one processor and storing instructions that, when executed by the at least one processor, perform operations including: receiving downlink control information (DCI) including information related to a resource region for a physical downlink shared channel (PDSCH) or a physical uplink shared channel (PUSCH), acquiring a resource indication value (RIV) from the DCI, acquiring a first length of allocated resource blocks based on the RIV, scaling the first length of allocated resource blocks to a second length of allocated resource blocks, based on a scaling factor and receiving the PDSCH or transmitting the PUSCH based on the second length of allocated resource blocks. The scaling factor may be $2^n$, and n may be non-negative integer.

A size of the DCI may be determined based on a first frequency range for initial access, and the PDSCH may be received or the PUSCH may be transmitted in a second frequency range.

Further, the scaling factor may be a largest integer of values calculated by a size of the first frequency range by $2^n$, which are equal to or less than a size of the second frequency range.

Further, the scaling factor may be acquired by applying a floor function to a value calculated by dividing a size of the second frequency range by a size of the first frequency range.

Further, a first starting resource block may be acquired based on the RIV, and scaled to a second starting resource block based on the scaling factor.

Further, the UE may be communicable with at least one of another UE, a network, a base station, or an autonomous vehicle.

The apparatus may be communicable with at least one of another UE, a network, a base station, or an autonomous vehicle.

In another aspect of the present disclosure, a UE for transmitting and receiving a data channel in a wireless communication system includes at least one transceiver, at least one processor, and at least one memory operably connectable to the at least one processor and storing instructions that, when executed by the at least one processor, perform operations including: receiving, via the at least one transceiver, downlink control information (DCI) including information related to a resource region for a physical downlink shared channel (PDSCH) or a physical uplink shared channel (PUSCH), acquiring a resource indication value (RIV) from the DCI, acquiring a first length of allocated resource blocks based on the RIV, scaling the first length of allocated resource blocks to a second length of allocated resource blocks, based on a scaling factor and receiving, via the at least one transceiver, the PDSCH or transmitting the PUSCH based on the second length of allocated resource blocks, the scaling factor is $2^n$, and n is non-negative integer.

In another aspect of the present disclosure, a method of transmitting and receiving a data channel by a base station (BS) in a wireless communication system includes transmitting DCI including resource region information related to an RIV, and transmitting a PDSCH or receiving a PUSCH, based on a first length of allocated resource blocks based on the RIV. First allocated resource blocks may be acquired by scaling second allocated resource blocks acquired based on the RIV, based on a scaling factor, and the scaling factor is $2^n$, and n is non-negative integer.

In another aspect of the present disclosure, a BS for transmitting and receiving a data channel in a wireless communication system includes at least one transceiver, at least one processor, and at least one memory operably connectable to the at least one processor and storing instructions that, when executed by the at least one processor, perform operations including: transmitting, via the at least one transceiver, downlink control information (DCI) including resource region information related to a resource indication value (RIV) and transmitting, via the at least one transceiver, a physical downlink shared channel (PDSCH) or receiving a physical uplink shared channel (PUSCH), based on a first length of allocated resource blocks based on the RIV, first allocated resource blocks are acquired by scaling second allocated resource blocks acquired based on the RIV, based on a scaling factor, and the scaling factor is $2^n$, and n is non-negative integer.

Advantageous Effects

According to the present disclosure, resources can be efficiently allocated to a downlink (DL) data channel or an uplink (UL) data channel in a situation in which the size of downlink control information (DCI) is limited.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE FOR CARRYING OUT THE INVENTION

Figure 1:
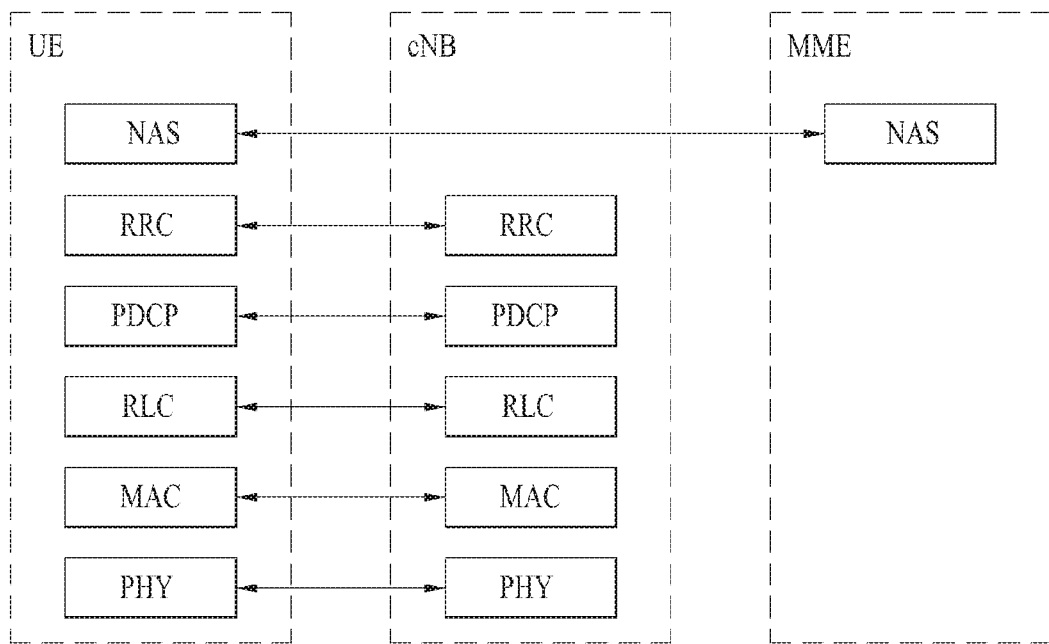
FIG. 1 is a view illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard.
Figure 1:
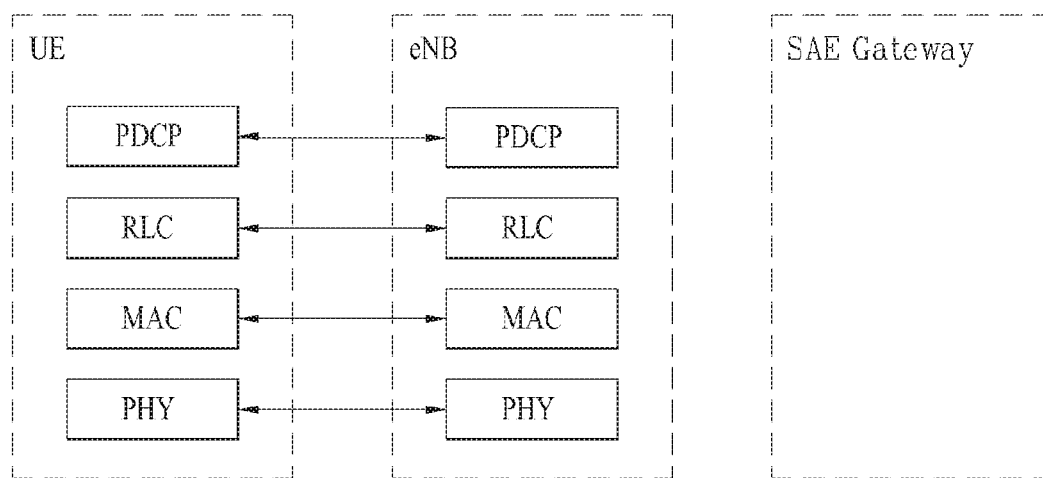

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/ PDSCH refers to a set of time-frequency resources or a set of REs, which carry downlink control information (DCI)/a control format indicator (CFI)/a DL acknowledgement/ negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/ PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/ PDSCH resource/PUCCH resource/PUSCH resource/ PRACH resource. Hereinbelow, if it is said that a UE transmits a PUCCH/PUSCH/PRACH, this means that UCI/ UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/ carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/ TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
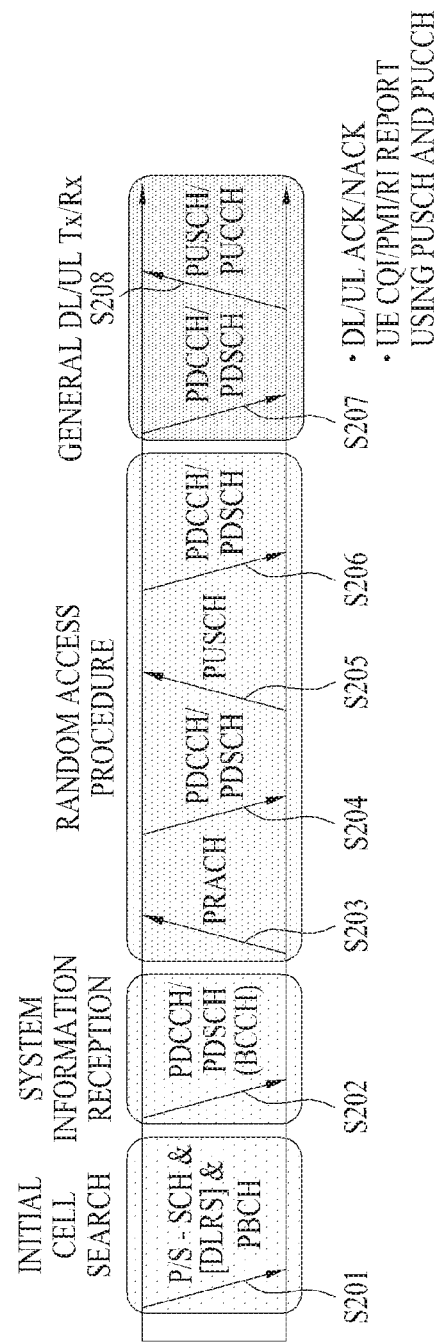
FIG. 2 is a view illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 3:
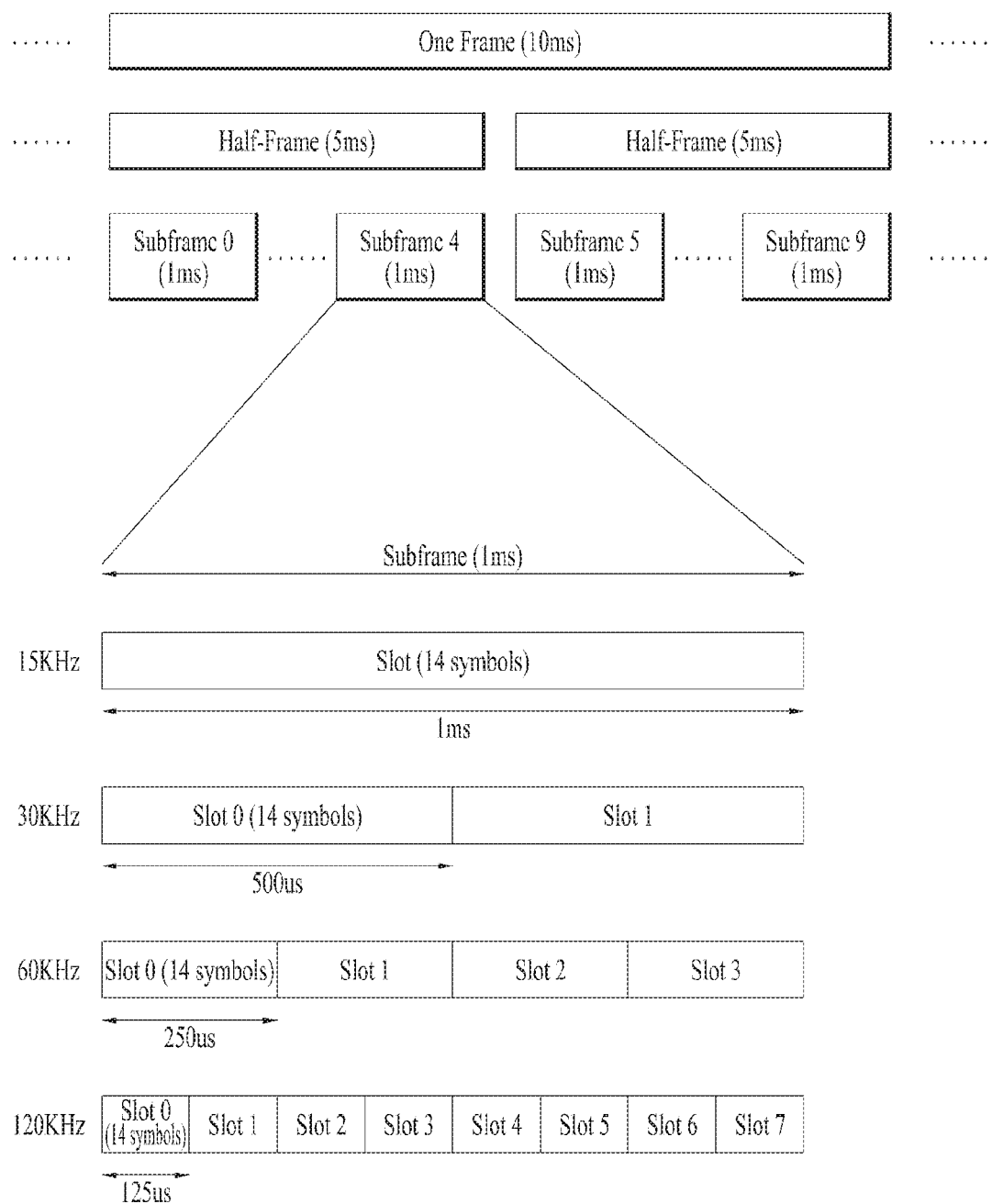
FIGS. 3 to 5 are views illustrating structures of a radio frame and slots used in a new RAT (NR) system.

FIG. 3 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe

[Table 2] illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

Figure 4:
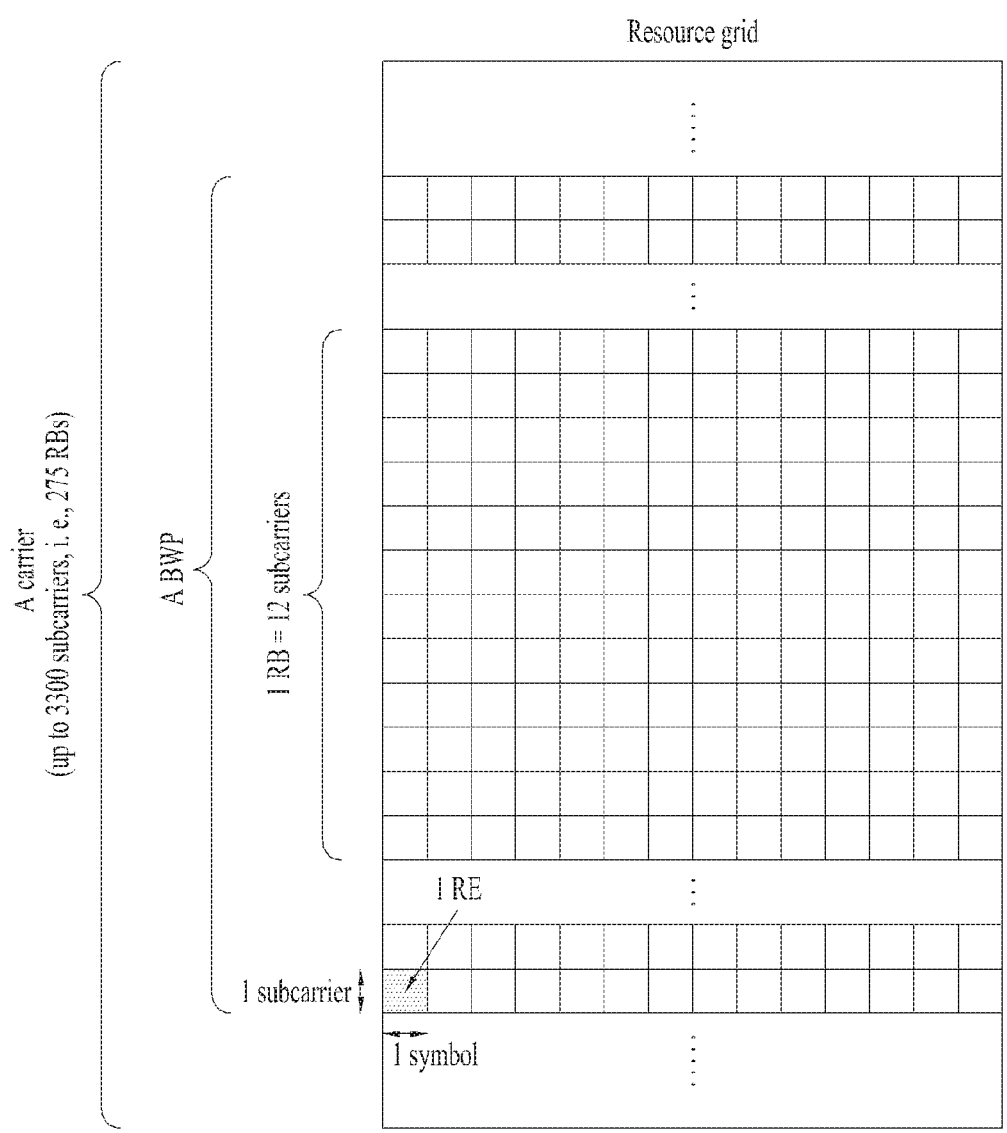

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells. FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 5:
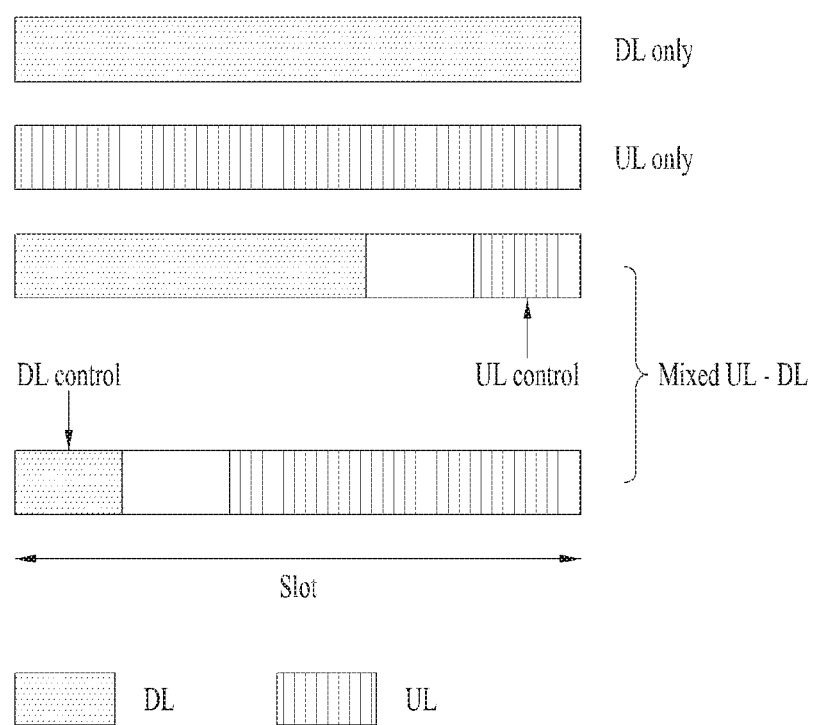

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+ DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

DL Channel Structures

An eNB transmits related signals on later-described DL channels to a UE, and the UE receives the related signals on the DL channels from the eNB.

(1) Physical Downlink Shared Channel (PDSCH)

The PDSCH delivers DL data (e.g., a DL-shared channel transport block (DL-SCH TB)) and adopts a modulation scheme such as quadrature phase shift keying (QPSK), 16-ary quadrature amplitude modulation (16QAM), 64-ary QAM (64QAM), or 256-ary QAM (256 QAM). A TB is encoded to a codeword. The PDSCH may deliver up to two codewords. The codewords are individually scrambled and modulated, and modulation symbols of each codeword are mapped to one or more layers. An OFDM signal is generated by mapping each layer together with a DMRS to resources, and transmitted through a corresponding antenna port.

(2) Physical Downlink Control Channel (PDCCH)

The PDCCH delivers DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (physical) resource block ((P)RB)).

Figure 6:
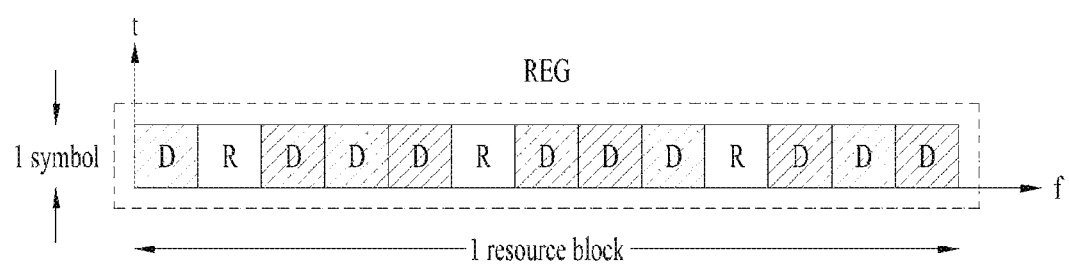
FIGS. 6 to 8 are views illustrating a physical downlink control channel (PDCCH) in the NR system.

FIG. 6 illustrates an exemplary structure of one REG. In FIG. 6, D represents an RE to which DCI is mapped, and R represents an RE to which a DMRS is mapped. The DMRS is mapped to RE #1, RE #5, and RE #9 along the frequency direction in one symbol.

The PDCCH is transmitted in a control resource set (CORESET). A CORESET is defined as a set of REGs with a given numerology (e.g., an SCS, a CP length, or the like). A plurality of CORESETs for one UE may overlap with each other in the time/frequency domain. A CORESET may be configured by system information (e.g., a master information block (MIB)) or UE-specific higher-layer signaling (e.g., RRC signaling). Specifically, the number of RBs and the number of symbols (3 at maximum) in the CORESET may be configured by higher-layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner. That is, the REGs are sequentially numbered in an increasing order, starting with 0 for the first OFDM symbol of the lowest-numbered RB in the CORESET.

CCE-to-REG mapping for the CORESET may be an interleaved type or a non-interleaved type. FIG. 10(a) is an exemplary view illustrating non-interleaved CCE-REG mapping, and FIG. 10(b) is an exemplary view illustrating interleaved CCE-REG mapping.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Figure 7:
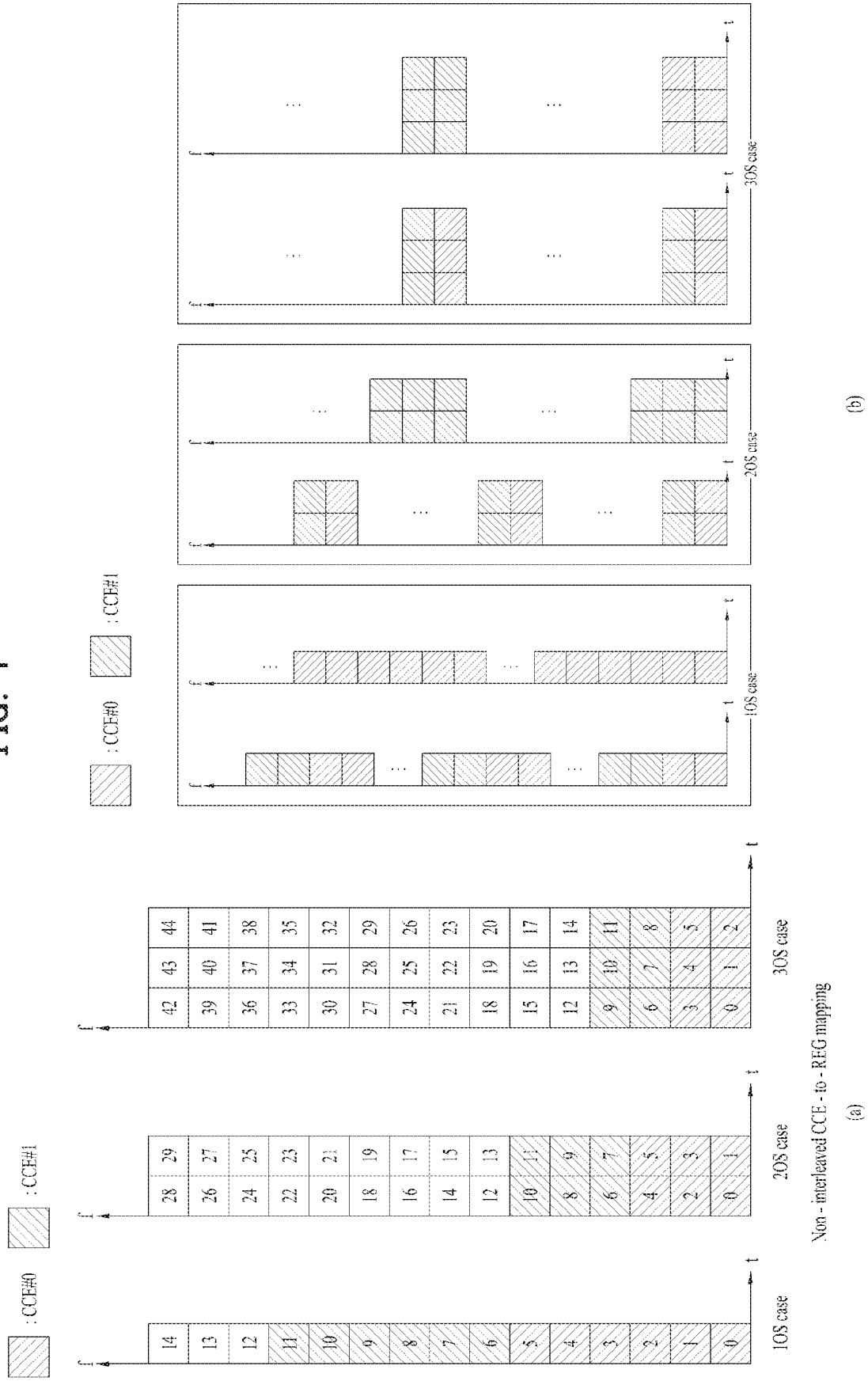
Figure 8:
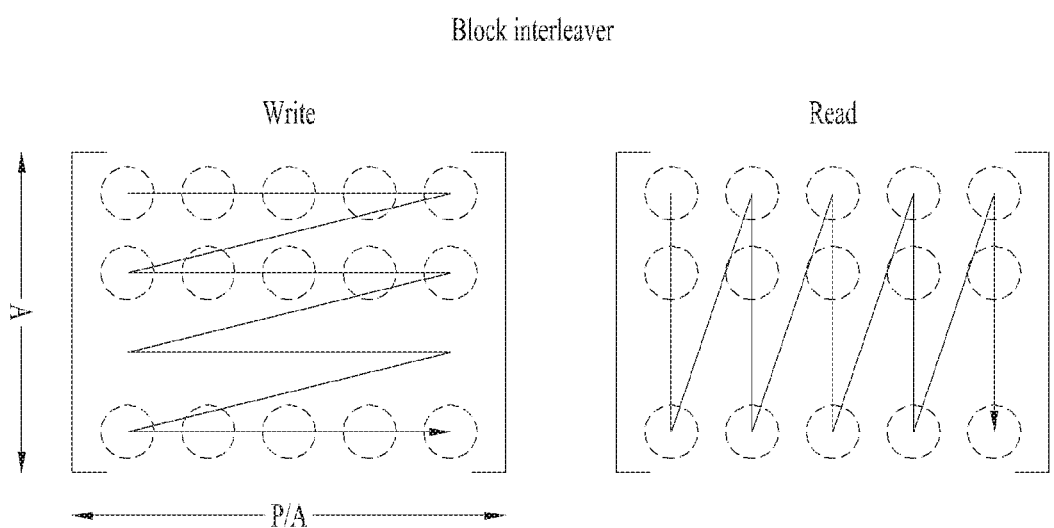

FIG. 7 illustrates an exemplary block interleaver. For the above interleaving operation, the number of rows in a (block) interleaver is set to one or 2, 3, and 6. If the number of interleaving units for a given CORESET is P, the number of columns in the block interleaver is P/A. In the block interleaver, a write operation is performed in a row-first direction, and a read operation is performed in a column-first direction, as illustrated in FIG. 8. Cyclic shift (CS) of an interleaving unit is applied based on an ID which is configurable independently of a configurable ID for the DMRS.

A UE acquires DCI delivered on a PDCCH by decoding (so-called blind decoding) a set of PDCCH candidates. A set of PDCCH candidates decoded by a UE are defined as a PDCCH search space set. A search space set may be a common search space or a UE-specific search space. The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in unit of slot) and a PDCCH monitoring offset (in unit of slot).

monitoringSymbolsWithinSlot: A PDCCH monitoring pattern (e.g., the first symbol(s) in the CORESET) in a PDCCH monitoring slot.

nrofCandidates: The number of PDCCH candidates for each AL={1, 2, 4, 8, 16} (one of 0, 1, 2, 3, 4, 5, 6, and 8).

Table 3 lists exemplary features of the respective search space types.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |

TABLE 3-continued

| Type | Search Space | RNTI | Use Case |
|---|---|---|---|
| | UE Specific | C-RNTI, or MCS-C-RNTI, or CS-RNTI(s) | User specific PDSCH decoding |

Table 4 lists exemplary DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL preemption information to a UE. DCI format 2_0 and/or DCI format 2_1 may be delivered to a corresponding group of UEs on a group common PDCCH which is a PDCCH directed to a group of UEs.

UL Channel Structures

A UE transmits related signals on later-described UL channels to an eNB, and the eNB receives the related signals on the UL channels from the UE.

(1) Physical Uplink Shared Channel (PUSCH)

The PUSCH delivers UL data (e.g., UL-shared channel transport block (UL-SCH TB)) and/or UCI, which are in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

(2) Physical Uplink Control Channel (PUCCH)

The PUCCH delivers UCI, a hybrid automatic repeat request-acknowledgement (HARQ-ACK), and/or a scheduling request (SR). PUCCHs are classified into short PUCCH and long PUCCH according to their transmission lengths. Table 5 illustrates exemplary PUCCH formats.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 delivers UCI of up to two bits, which is mapped in a sequence-based manner, for transmission. Specifically, the UE transmits specific UCI to the eNB by transmitting one of a plurality of sequences on a PUCCH in PUCCH format 0. Only when the UE transmits a positive SR, the UE transmits the PUCCH of PUCCH format 0 in PUCCH resources for a corresponding SR configuration.

PUCCH format 1 delivers UCI of up to two bits, of which the modulation symbols are spread by an orthogonal cover code (OCC) (which is configured differently depending on whether frequency hopping is applied) in the time domain. A DMRS is transmitted in a symbol that does not carry a modulation symbol (i.e., in time division multiplexing (TDM)).

PUCCH format 2 delivers UCI of more than two bits, of which the modulation symbols are transmitted in frequency division multiplexing (FDM) with a DMRS. The DMRS is positioned at a density of ⅓ in symbols #1, #4, #7, and #10 within a given RB. A pseudo-noise (PN) sequence is used for a DMRS sequence. For 2-symbol PUCCH format 2, frequency hopping may be enabled.

PUCCH format 3 has no capacity of multiplexing UEs in the same PRB, and delivers UCI of more than two bits. In other words, PUCCH resources of PUCCH format 3 do not include an OCC. In PUCCH format 3, a modulation symbol is transmitted in TDM with a DMRS.

PUCCH format 4 supports multiplexing of up to four UEs within the same PRB, and delivers UCI of more than two bits. In other words, PUCCH resources of PUCCH format 4 include an OCC. In PUCCH format 4, a modulation symbol is transmitted in TDM with a DMRS.

Multiplexing of Short PUCCH and Long PUCCH

Figure 9:
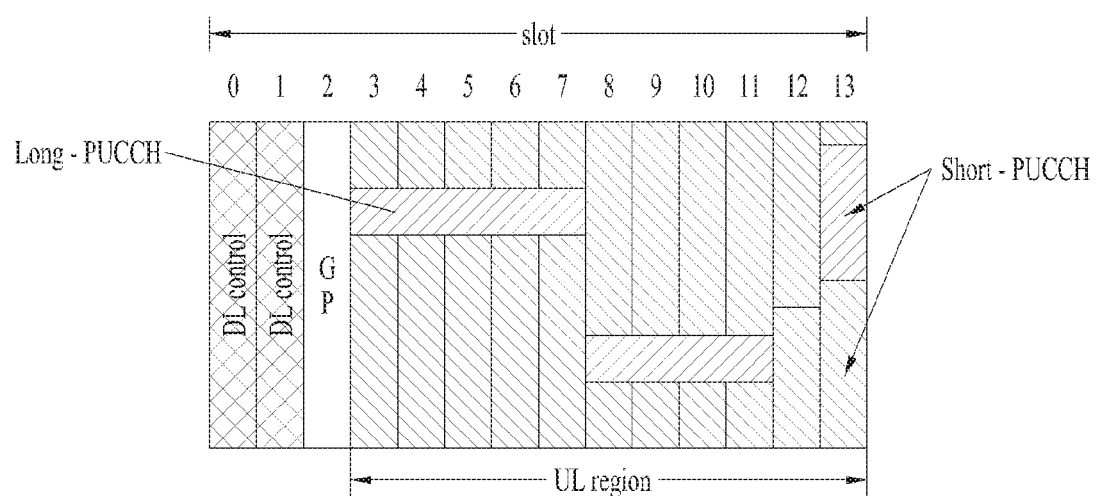
FIG. 9 is a view illustrating multiplexing between a long physical uplink control channel (PUCCH) and a short PUCCH in the NR system.

FIG. 9 illustrates exemplary multiplexing between a UL signal and short and long PUCCHs.

A PUCCH (e.g., PUCCH format 0/2) and a PUSCH may be multiplexed in TDM or FDM. A short PUCCH and a long PUCCH from different UEs may be multiplexed in TDM or FDM. Short PUCCHs from a single UE may be multiplexed in TDM within one slot. A short PUCCH and a long PUCCH from a single UE may be multiplexed in TDM or FDM within one slot.

Bandwidth Part (BWP)

The NR system may support up to 400 MHz per carrier. If a UE operating in such a wideband carrier always keeps a radio frequency (RF) module on for the whole carrier, the battery consumption of the UE may increase. Further, considering multiple use cases (e.g., eMBB, URLLC, mMTC, V2X, etc.) operating in one wideband carrier, different numerologies (e.g., SCSs) may be supported for different frequency bands of the carrier. Further, each UE may have a different capability regarding a maximum bandwidth. In this regard, the eNB may indicate the UE to operate only in a partial bandwidth, not the total bandwidth of the wideband carrier. The partial bandwidth is referred to as a bandwidth part (BWP). A BWP in the frequency domain is a subset of contiguous common RBs defined for numerology $\mu_i$ in BWP i of the carrier, and one numerology (e.g., SCS, CP length, and/or slot/mini-slot duration) may be configured for the BWP.

The eNB may configure one or more BWPs in one carrier configured for the UE. If UEs are concentrated in a specific BWP, some of the UEs may be switched to another BWP, for load balancing. For frequency-domain inter-cell interference cancellation between adjacent cells, BWPs at both ends of the total bandwidth of a cell except for some center spectrum may be configured in the same slot. That is, the eNB may configure at least one DL/UL BWP for the UE associated with the wideband carrier, activate at least one of DL/UL BWP(s) configured at a specific time (by L1 signaling which is a physical-layer control signal, a MAC control element (CE) which is a MAC-layer control signal, or RRC signaling), indicate the UE to switch to another configured DL/UL BWP (by L1 signaling, a MAC CE, or RRC signaling), or set a timer value and switch the UE to a predetermined DL/UL BWP upon expiration of the timer value. To indicate switching to another configured DL/UL BWP, DCI format 1_1 or DCI format 0_1 may be used. Particularly, an activated DL/UL BWP is referred to as an active DL/UL BWP. During initial access or before RRC connection setup, the UE may not receive a DL/UL BWP configuration. A DL/UL BWP that the UE assumes in this situation is referred to as an initial active DL/UL BWP.

A DL BWP is a BWP used to transmit and receive a DL signal such as a PDCCH and/or a PDSCH, and a UL BWP is a BWP used to transmit and receive a UL signal such as a PUCCH and/or a PUSCH.

PDSCH Resource Allocation in Frequency Domain

Two DL resource allocation schemes, type 0 and type 1 are supported for the PDSCH/PUSCH. Upon receipt of scheduling information in DCI format 0_0/1_0, the UE assumes that DL resource allocation type 1 is used.

If DCI is configured to indicate a DL resource allocation type by a part of a Frequency domain resource assignment field by setting a higher-layer parameter 'resourceAllocation' to 'dynamicswitch', the UE uses DL resource allocation type 0 or type 1 as defined by the DCI field. Otherwise, the UE uses DL resource allocation type 0 or type 1 according to the value of the higher-layer parameter 'resourceAllocation'.

In DL resource allocation type 0, the resource allocation field of the DCI includes bitmap information. The bitmap information indicates RBGs allocated to the UE. An RBG is a set of contiguous RBs.

In DL resource allocation type 1, the resource allocation field of the DCI carries a resource indication value (RIV). A starting RB and a length of contiguously allocated RBs may be derived from the RIV.

DCI indicating BWP switching may not satisfy a DCI field size required for a new BWP, thereby causing scheduling restriction. Moreover, due to a DCI size budget and/or DCI size alignment, a DCI field size may be too small to indicate an actual area carrying a PDSCH or a PUSCH. For example, if DCI, which has a size determined based on a common search space and/or an initial BWP, is transmitted in a UE-specific search space and/or applied to an active BWP other than the initial BWP, (In other words, when size of DCI, which is transmitted via UE specific search space and/or is transmitted in an active BWP other than the initial BWP, is determined based on DCI size in common search space and/or initial BWP) DCI may be too small in size to fully indicate a resource allocation for a PDSCH or PUSCH transmitted in the active BWP.

For the foregoing reasons, scheduling restriction may be imposed on resource allocation for the PDSCH or PUSCH. Accordingly, the present disclosure proposes a method of interpreting a resource allocation field in DCI in the above-described situation. While a method of interpreting a resource allocation field based on an RIV is described in an embodiment of the present disclosure, for the convenience of description, the idea of the present disclosure may also be extended/applied to any other resource allocation type or any DCI field other than the resource allocation field.

Figure 10:
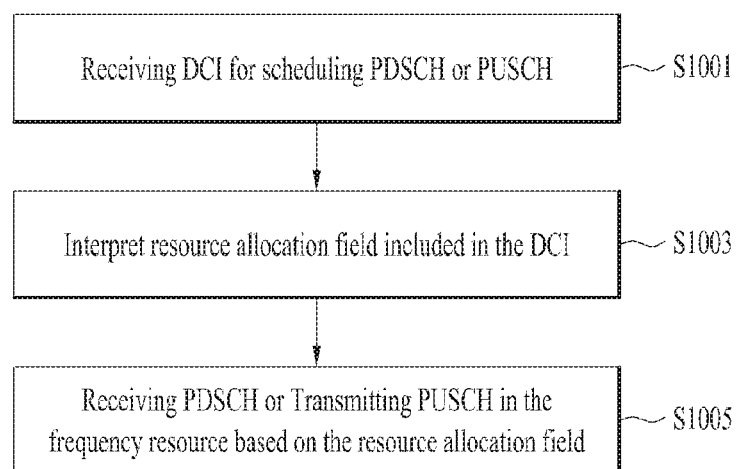
FIGS. 10 to 12 are flowcharts illustrating operations of a user equipment (UE), a base station (BS), and a network according to an embodiment of the present disclosure.
Figure 11:
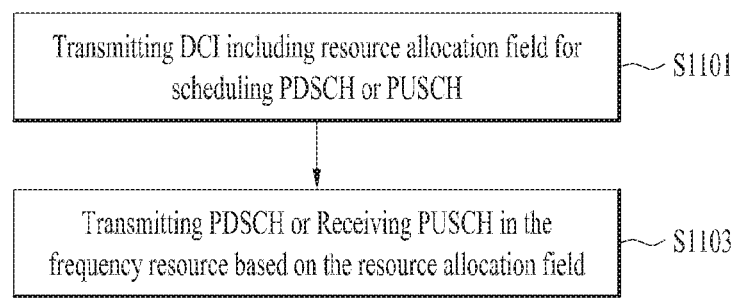
Figure 12:
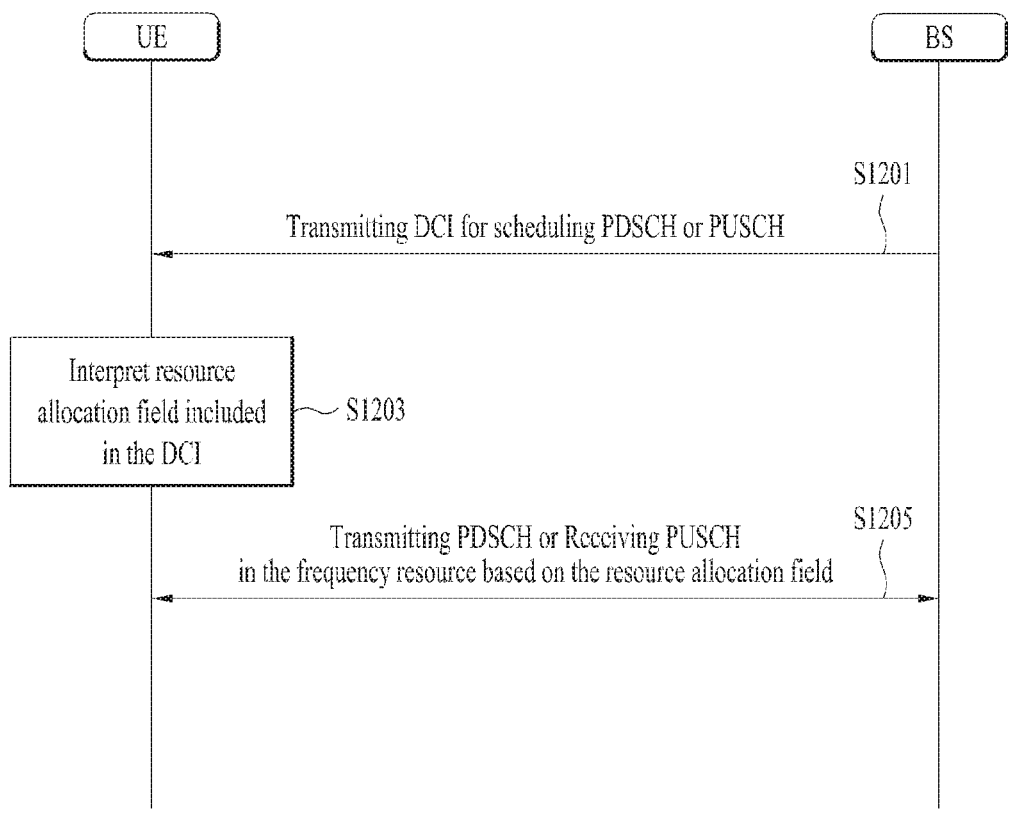

FIGS. 10 to 12 are views illustrating operations of a UE, an eNB, and a network according to the present disclosure.

Referring to FIG. 10, a UE according to the present disclosure may receive DCI for scheduling a PDSCH or a PUSCH (S1001). For example, the DCI may be received in a UE-specific search space. The UE then interprets a resource allocation field in the DCI. The resource allocation field is a field used to allocate resources for the PDSCH or PUSCH. The resource allocation field may be interpreted according to Embodiment 1 and/or Embodiment 2 which will be described below (S1003). The UE may receive the PDSCH or transmit the PUSCH in frequency resources resulting from interpretation of the resource allocation field (S1005).

Referring to FIG. 11, an eNB according to the present disclosure may transmit DCI including a resource allocation field for scheduling a PDSCH or a PUSCH (S1101). The DCI may be transmitted in a UE-specific search space. The eNB may transmit the PDSCH or receive the PUSCH in frequency resources based on the resource allocation field (S1103). The frequency resources based on the resource allocation field may be determined according to Embodiment 1 and/or Embodiment 2 which will be described below.

With reference to FIG. 12, an operation of a network according to the present disclosure will be described. Referring to FIG. 12, an eNB may transmit DCI including a resource allocation field for scheduling a PDSCH or a PUSCH (S1201). The DCI may be transmitted in a UE-specific search space. Upon receipt of the DCI, a UE interprets the resource allocation field in the DCI. The resource allocation field is a field used to allocate resources for the PDSCH or the PUSCH. The resource allocation field may be interpreted according to Embodiment 1 and/or Embodiment 2 which will be described below (S1203). The UE may receive the PDSCH or transmit the PUSCH in frequency resources resulting from the interpretation of the resource allocation field. In other words, the eNB may transmit the PDSCH or receive the PUSCH in the frequency resources based on the resource allocation field (S1205).

Now, a description will be given of embodiments of determining frequency resources for a PDSCH and a PUSCH by interpreting a resource allocation field in DCI in the above-described operations S1003, S1103, and S1203.

When the size of a transmitted DCI field is smaller than a required DCI field size, two methods of interpreting the DCI field may be considered in the NR system.

One of the methods is to perform zero padding before interpreting the DCI field. Although this method enables flexible selection of a starting RB, the length of allocated RBs may be selected restrictively and small.

The other method is to scale the value of the DCI field before interpreting the DCI field.

For example, frequency resource allocation information for an active BWP may be interpreted by multiplying a scaling factor based on an RIV (Resource Indication Value) indicated by the DCI.

In other words, frequency resource allocation information for the active BWP may be interpreted considering the scaling factor when the frequency resource allocation information for the active BWP may be interpreted based on the RIV.

Specifically, a first length of allocated RBs may be defined by multiplying a second length of allocated RBs that can be allocated in the size-defining BWP (e.g., the initial BWP) by a scaling factor. Furthermore, the first length of allocated RBs may be obtained based on an RIV indicated by the DCI and may be used for a length of allocated RBs for active BWP.

In another example, a starting RB and a length of allocated RBs are derived by interpreting the RIV indicated by the DCI based on a size-defining BWP (e.g., an initial BWP). A scaling factor may then be applied to each of the starting RB and length of allocated RBs, and the scaled starting RB and the scaled length of allocated RBs may be mapped to an active BWP.

However, either of the cases may not be feasible at least for a DFT-s-OFDM UL or a UL with PUSCH-tp=enabled. This is because in a DFT precoding-based case, a UE needs to allocate as many RBs as a multiple of 2, 3 and/or 5 to a PUSCH in consideration of complexity.

According to the above exemplary scaling method, however, an unnecessary combination that does not satisfy the condition of allocating as many RBs as a multiple of 2, 3 and/or 5 may be added, or a combination satisfying the condition may be omitted.

Accordingly, the present disclosure proposes methods of, when RBs are allocated to a PDSCH or PUSCH, performing scaling, while satisfying the condition of allocating as many RBs as a multiple of 2, 3 and/or 5.

If the size of a DCI field is smaller than that of a DCI field for actually scheduling a PDSCH or PUSCH, the following resource allocation methods may be considered.

Embodiment 1

RIV values with the length of allocated RBs being a multiple of 2, 3 and/or 5 may be preferentially selected from among RIV values and mapped or arranged in an ascending or descending order, starting from the lowest or highest RIV. If RIV values reduced from the existing RIV values are generated, combinations each with the length of allocated RBs different from a multiple of 2, 3 and/or 5 may be excluded from the existing RIV values. The remaining RIV values except for the RIV values each with a length of allocated RBs different from a multiple of 2, 3 and/or 5, that is, the RIV values each with a length of allocated RBs equal to a multiple of 2, 3 and/or 5 may be mapped or arranged in an ascending or descending order, starting from the lowest or highest RIV.

Embodiment 2

When a starting RB and a length of allocated RBs are derived from an RIV value by applying a scaling factor, the scaling factor is selected such that the length of allocated RBs is equal to a multiple of 2, 3 and/or 5. In other words, the starting RB and the length of allocated RB may be derived from the RIV value, based on the size of a size-defining BWP such as an initial BWP, and multiplied by the scaling factor, thereby acquiring a starting RB and a length of allocated RBs for an active BWP. Herein, the scaling factor may be selected such that the length of allocated RBs is a multiples of 2, 3 and/or 5.

For example, the scaling factor may be determined based on a combination of a, b and c resulting in the largest of values calculated by multiplying the size of the size-defining BWP such as the initial BWP by $(2^a*3^b*5^c)$, which are equal to or less than the size of a target BWP (i.e., an active BWP). In other words, the scaling factor may be determined based on a combination of a, b and c which results in the largest value of size-defining BWP*$(2^a*3^b*5^c)$ satisfying the condition that size-defining BWP*$(2^a*3^b*5^c) \leq$ target BWP (active BWP).

Herein, a, b and c may be non-negative integers. That is, a, b and c may be zero or positive integers. Accordingly, one or two of a, b and c may be zero. Further, the scaling factor may be determined to be a positive integer. Further, the scaling factor may be determined based on a combination of a, b and c resulting in the largest integer of values calculated by multiplying the size of the size-defining BWP by $(2^a*3^b*5^c)$, which are equal to or less than the size of the target BWP (i.e., active BWP).

Further, the scaling factor may be configured based on a combination of a, b and c which results in the smallest of $(2^a*3^b*5^c)$ values equal to or larger than the size of the target BWP.

Further, the scaling factor may be determined by using, as parameters, the size of a BWP (e.g., the initial BWP) used to determine the size of a resource allocation (RA) bit field and the size of an actual BWP (e.g., active BWP) to carry a PDSCH or a PUSCH.

For example, the scaling factor may be derived by applying a floor, ceiling or round function to a value calculated by dividing the size of the actual BWP to carry the PDSCH or the PUSCH by the size of the BWP used to determine the size of the RA bit field.

If a starting RB index and a length of allocated RBs which are acquired by scaling an RIV value by the derived scaling factor are not multiples of 2, 3 and/or 5, the starting RB index and/or the length of allocated RBs may be converted in the following additional process.

1) The RIV value may be scaled based on the scaling factor, and then the starting RB index and the length of allocated RBs may be converted to a target BWP-based (e.g., an active BWP-based) RIV value. The RIV value may be increased or decreased such that the length of allocated RBs is a multiple of 2, 3 and/or 5, and then converted to a starting RB index and a length of allocated RBs.

2) The RIV value is scaled based on the scaling factor, and then a starting RB index and a length of allocated RBs are acquired from the scaled RIV value. Then, the length of allocated RBs is changed to a new length of allocated RBs equal to a multiple of 2, 3 and/or 5. For example, the length of allocated RBs is changed to the new length of allocated RBs, based on a combination of a, b and c resulting in the largest of $(2^a*3^b*5^c)$ values satisfying the condition that $(2^a*3^b*5^c) \leq$ the length of allocated RBs.

In other words, a combination of a, b and c leading to a largest $(2^a*3^b*5^c)$ value equal to or less than the acquired length of allocated RBs may be selected and used to determine the new length of allocated RBs.

Herein, a, b and c may be non-negative integers. That is, a, b and c may be zero or positive integers. Accordingly, one or two of a, b and c may be zero. Further, the scaling factor may be determined to be a positive integer.

The foregoing methods of interpreting a bit field included in DCI may be applied commonly to a PDSCH and a PUSCH. For example, regarding the PUSCH, the methods may be applied when a DFT-s-OFDM waveform is used or PUSCH-tp is enabled.

Figure 13:
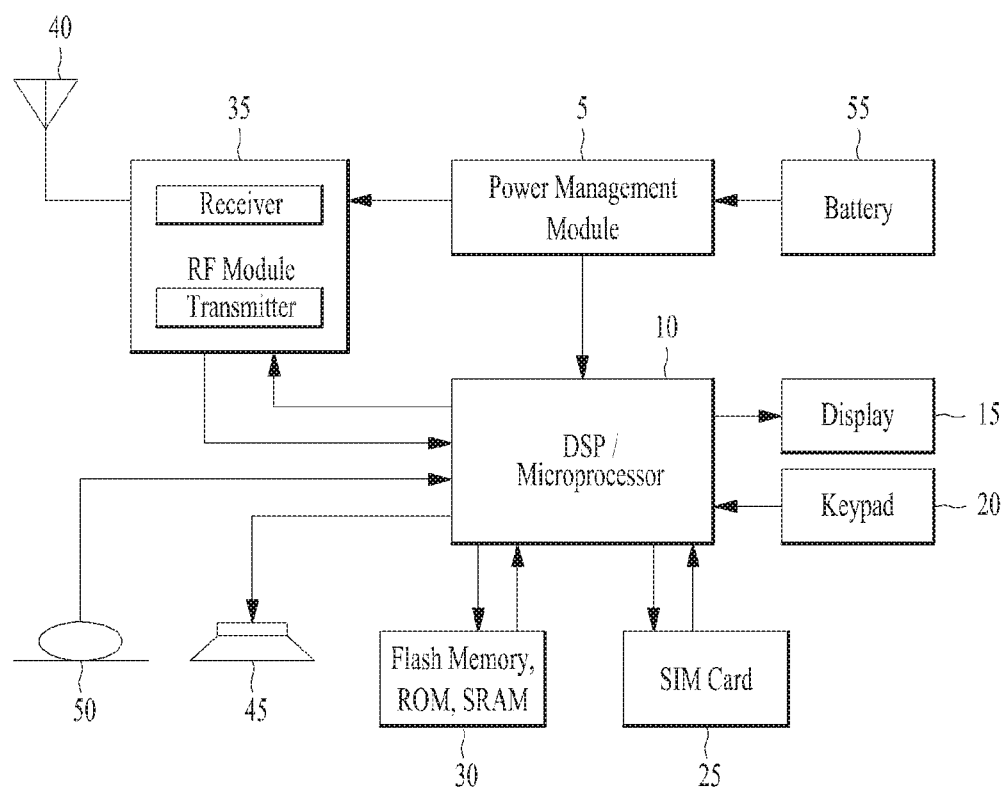
FIG. 13 is a block diagram illustrating components of a wireless communication apparatus for implementing the present disclosure.

FIG. 13 shows an example of a wireless communication apparatus according to an implementation of the present disclosure.

The wireless communication apparatus illustrated in FIG. 13 may represent a UE and/or a base station according to an implementation of the present disclosure. However, the wireless communication apparatus of FIG. 13 is not necessarily limited to the UE and/or the base station according to the present disclosure, and may implement various types of apparatuses, such as a vehicle communication system or apparatus, a wearable apparatus, a laptop, etc.

More specifically, the apparatus may be any of a base station, a network node, a transmitting UE, a receiving UE, a wireless apparatus, a wireless communication apparatus, a vehicle, a vehicle equipped with an autonomous driving function, an unmanned aerial vehicle (UAV), an artificial intelligence (AI) module, a robot, an augmented reality (AR) device, a virtual reality (VR) device, an MTC device, an IoT device, medical equipment, a FinTech device (or financial device), a security device, a weather/environmental device, and a device related to fourth industrial revolution fields or 5G services. For example, a UAV may be an unmanned aircraft flying according to a wireless control signal. For example, an MTC device and an IoT device do not need direct human intervention or manipulation, including a smart meter, a vending machine, a thermometer, a smart bulb, a door lock, and various sensors. For example, medical equipment refers to a device designed to diagnose, remedy, alleviate, treat, or prevent diseases or a device that examines, replaces or modifies a structure or function, including diagnosis equipment, a surgery device, a vitro diagnostic kit, a hearing aid, and a procedure device. For example, a security device is installed to prevent probable dangers and maintain safety, including a camera, a closed-circuit television (CCTV), and a black box. For example, the FinTech device is a device that provides financial services such as mobile payment. For example, a weather/environmental device may refer to a device that monitors and predicts weather/environment.

Further, a transmitting UE and a receiving UE may include a portable phone, a smartphone, a laptop computer, a digital broadcasting terminal, a personal digital assistant (PDA), a portable multimedia player (PMP), a navigator, a slate personal computer (PC), a tablet PC, an ultrabook, a wearable device (e.g., a smart watch, smart glasses, a head-mounted display (HMD)), and a foldable device. For example, an HMD is a display device wearable on the head, which may be used to implement VR or AR.

In the example of FIG. 13, a UE and/or a base station according to an implementation of the present disclosure includes at least one processor 10 such as a digital signal processor or a microprocessor, a transceiver 35, a power management module 5, an antenna 40, a battery 55, a display 15, a keypad 20, at least one memory 30, a subscriber identity module (SIM) card 25, a speaker 45, and a microphone 50, and the like. In addition, the UE and/or the base station may include a single antenna or multiple antennas. The transceiver 35 may be also referred to as an RF module.

The at least one processor 10 may be configured to implement the functions, procedures and/or methods described in FIGS. 1 to 12. In at least some of the implementations described in FIGS. 1 to 12, the at least one processor 10 may implement one or more protocols, such as layers of the air interface protocol (e.g., functional layers).

The at least one memory 30 is connected to the at least one processor 10 and stores information related to the operation of the at least one processor 10. The at least one memory 30 may be internal or external to the at least one processor 10 and may be coupled to the at least one processor 10 via a variety of techniques, such as wired or wireless communication.

The user can input various types of information (for example, instruction information such as a telephone number) by various techniques such as pressing a button on the keypad 20 or activating a voice using the microphone 50. The at least one processor 10 performs appropriate functions such as receiving and/or processing information of the user and dialing a telephone number.

It is also possible to retrieve data (e.g., operational data) from the SIM card 25 or the at least one memory 30 to perform the appropriate functions. In addition, the at least one processor 10 may receive and process GPS information from the GPS chip to obtain location information of the UE and/or base station such as vehicle navigation, map service, or the like, or perform functions related to location information. In addition, the at least one processor 10 may display these various types of information and data on the display 15 for reference and convenience of the user.

The transceiver 35 is coupled to the at least one processor 10 to transmit and/or receive radio signals, such as RF signals. At this time, the at least one processor 10 may control the transceiver 35 to initiate communications and transmit wireless signals including various types of information or data, such as voice communication data. The transceiver 35 may comprise a receiver for receiving the radio signal and a transmitter for transmitting. The antenna 40 facilitates the transmission and reception of radio signals. In some implementations, upon receipt of a radio signal, the transceiver 35 may forward and convert the signal to a baseband frequency for processing by the at least one processor 10. The processed signals may be processed according to various techniques, such as being converted into audible or readable information, and such signals may be output via the speaker 45.

In some implementations, a sensor may also be coupled to the at least one processor 10. The sensor may include one or more sensing devices configured to detect various types of information, including velocity, acceleration, light, vibration, and the like. The at least one processor 10 receives and processes the sensor information obtained from the sensor such as proximity, position, image, and the like, thereby performing various functions such as collision avoidance and autonomous travel.

Meanwhile, various components such as a camera, a USB port, and the like may be further included in the UE and/or the base station. For example, a camera may be further connected to the at least one processor 10, which may be used for a variety of services such as autonomous navigation, vehicle safety services, and the like.

FIG. 13 merely illustrates one example of an apparatuses constituting the UE and/or the base station, and the present disclosure is not limited thereto. For example, some components, such as keypad 20, Global Positioning System (GPS) chip, sensor, speaker 45 and/or microphone 50 may be excluded for UE and/or base station implementations in some implementations.

Specifically, an operation of the wireless communication apparatus depicted in FIG. 13 as a UE to implement the embodiments of the present disclosure will be described. If the wireless communication apparatus is a UE according to an embodiment of the present disclosure, the processor 10 may control the transceiver 35 to receive DCI for scheduling a PDSCH or a PUSCH. For example, the DCI may be received in a UE-specific search space. The processor 10 then interprets a resource allocation field in the DCI. The resource allocation field refers to a field used to allocate resources for the PDSCH or PUSCH, and may be interpreted according to the foregoing Embodiment 1 and/or Embodiment 2. The processor 10 may control the transceiver 35 to receive the PDSCH or transmit the PUSCH in frequency resources resulting in the interpretation of the resource allocation field.

If the wireless communication apparatus depicted in FIG. 13 is a base station, to implement the embodiments of the present disclosure, the processor 10 may control the transceiver 35 to transmit DCI for scheduling a PDSCH or a PUSCH. For example, the DCI may be transmitted in a UE-specific search space. The processor 10 may control the transceiver 35 to transmit the PDSCH or receive the PUSCH in frequency resources based on the resource allocation field. The frequency resources may be determined based on the resource allocation field according to the foregoing Embodiment 1 and/or Embodiment 2.

The implementations described above are those in which the elements and features of the present disclosure are combined in a predetermined form. Each component or feature shall be considered optional unless otherwise expressly stated. Each component or feature may be implemented in a form that is not combined with other components or features. It is also possible to construct implementations of the present disclosure by combining some of the elements and/or features. The order of the operations described in the implementations of the present disclosure may be changed. Some configurations or features of certain implementations may be included in other implementations, or may be replaced with corresponding configurations or features of other implementations. It is clear that the claims that are not expressly cited in the claims may be combined to form an implementation or be included in a new claim by an amendment after the application.

The specific operation described herein as being performed by the base station may be performed by its upper node, in some cases. That is, it is apparent that various operations performed for communication with a terminal in a network including a plurality of network nodes including a base station can be performed by the base station or by a network node other than the base station. A base station may be replaced by terms such as a fixed station, a Node B, an eNode B (eNB), an access point, and the like.

Implementations according to the present disclosure may be implemented by various means, for example, hardware, firmware, software or a combination thereof. In the case of hardware implementation, an implementation of the present disclosure may include one or more application specific integrated circuits (ASICs), digital signal processors (DSPs), digital signal processing devices (DSPDs), programmable logic devices (PLDs) field programmable gate arrays, processors, controllers, microcontrollers, microprocessors, and the like.

In the case of an implementation by firmware or software, an implementation of the present disclosure may be implemented in the form of a module, a procedure, a function, or the like for performing the functions or operations described above. The software code can be stored in a memory unit and driven by the processor. The memory unit may be located inside or outside the processor, and may exchange data with the processor by various well-known means.

It will be apparent to those skilled in the art that the present disclosure may be embodied in other specific forms without departing from the spirit of the disclosure. Accordingly, the above description should not be construed in a limiting sense in all respects and should be considered illustrative. The scope of the present disclosure should be determined by rational interpretation of the appended claims, and all changes within the scope of equivalents of the present disclosure are included in the scope of the present disclosure.

INDUSTRIAL APPLICABILITY

While the method and apparatus for transmitting and receiving a data channel have been described in the context of a 5G NR (or NewRAT) system, by way of example, the method and apparatus are also applicable to various wireless communication systems as well as the NR system.

What is claimed is:

1. A method performed by a user equipment (UE) configured to operate in a wireless communication system, the method comprising:
receiving downlink control information (DCI) related to scheduling a physical uplink shared channel (PUSCH); and
transmitting the PUSCH in an active bandwidth part (BWP) based on a first allocated resource block length,
wherein the DCI comprises a resource indication value (RIV) related to a second allocated resource block length,
wherein the first allocated resource block length is obtained based on scaling the second allocated resource block length by a scaling factor,
wherein the scaling factor is determined as a maximum value among a value satisfying $2^n$ and less than a first value,
wherein the first value is obtained by applying a floor function to a second value identical to dividing a size of the active BWP to a size of an initial BWP, and
wherein n is a non-negative integer number.

2. The method of claim 1, wherein the transmitting of the PUSCH is performed further based on a first starting resource block,
wherein the RIV is further related to information regarding a second starting resource block, and
wherein the first starting resource block is obtained based on scaling the second starting resource block by the scaling factor.

3. The method of claim 2, wherein, in a frequency domain, a starting resource block of a frequency resource on which the transmitting of the PUSCH is performed is identified based on the first starting resource block, and
wherein, in the frequency domain, a length of the frequency resource is identified based on the first allocated resource block length.

4. An apparatus configured to operate in a wireless communication system, the apparatus comprising:
a memory; and
at least one processor coupled with the memory,
wherein the at least one processor is configured to:
receive downlink control information (DCI) related to scheduling a physical uplink shared channel (PUSCH); and
transmit the PUSCH in an active bandwidth part (BWP) based on a first allocated resource block length, wherein the DCI comprises a resource indication value (RIV) related to a second allocated resource block length, wherein the first allocated resource block length is obtained based on scaling the second allocated resource block length by a scaling factor, wherein the scaling factor is determined as a maximum value among a value satisfying $2^n$ and less than a first value, wherein the first value is obtained by applying a floor function to a second value identical to dividing a size of the active BWP to a size of an initial BWP, and wherein n is a non-negative integer number.

5. The apparatus of claim 4, wherein the transmitting of the PUSCH is performed further based on a first starting resource block, wherein the RIV is further related to information regarding a second starting resource block, and wherein the first starting resource block is obtained based on scaling the second starting resource block by the scaling factor.

6. The apparatus of claim 5, wherein, in a frequency domain, a starting resource block of a frequency resource on which the transmitting of the PUSCH is performed is identified based on the first starting resource block, and wherein, in the frequency domain, a length of the frequency resource is identified based on the first allocated resource block length.

7. A method performed by a base station (BS) configured to operate in a wireless communication system, the method comprising:

transmitting downlink control information (DCI) related to scheduling a physical uplink shared channel (PUSCH); and receiving the PUSCH in an active bandwidth part (BWP) based on a first allocated resource block length, wherein the DCI comprises a resource indication value (RIV) related to a second allocated resource block length, wherein the first allocated resource block length is obtained based on scaling the second allocated resource block length by a scaling factor, wherein the scaling factor is determined as a maximum value among a value satisfying $2^n$ and less than a first value, wherein the first value is obtained by applying a floor function to a second value identical to dividing a size of the active BWP to a size of an initial BWP, and wherein n is a non-negative integer number.

8. An apparatus configured to operate in a wireless communication system, the apparatus comprising:

a memory; and at least one processor coupled with the memory, wherein the at least one processor is configured to:

transmit downlink control information (DCI) related to scheduling a physical uplink shared channel (PUSCH); and receive the PUSCH in an active bandwidth part (BWP) based on a first allocated resource block length, wherein the DCI comprises a resource indication value (RIV) related to a second allocated resource block length, wherein the first allocated resource block length is obtained based on scaling the second allocated resource block length by a scaling factor, wherein the scaling factor is determined as a maximum value among a value satisfying $2^n$ and less than a first value, wherein the first value is obtained by applying a floor function to a second value identical to dividing a size of the active BWP to a size of an initial BWP, and wherein n is a non-negative integer number.

\* \* \* \* \*